June 9, 1964
MASUMI EDA ETAL
3,136,173
DRIVING MECHANISM OF THE CUTTER SPINDLE IN GEAR SHAPER
Filed Aug. 15, 1961
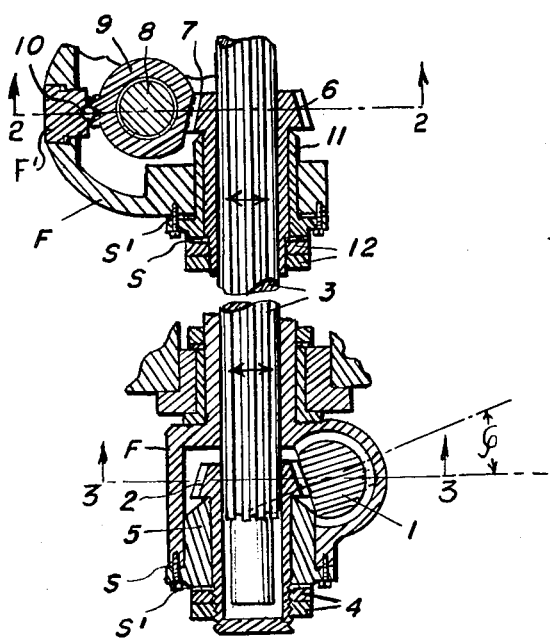
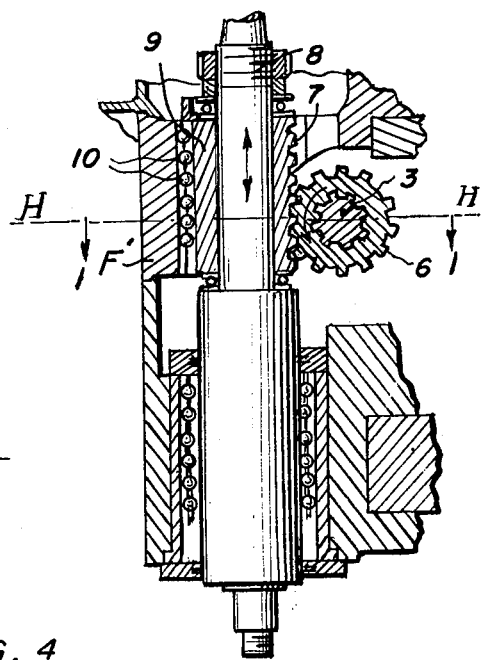
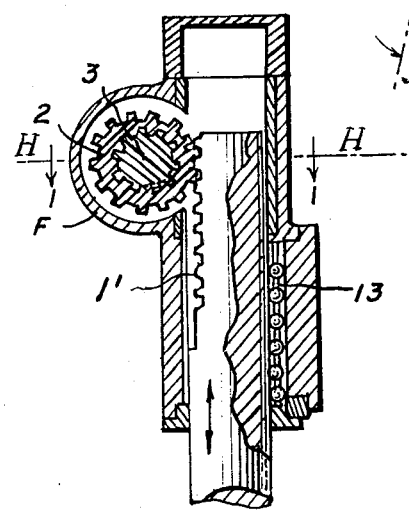
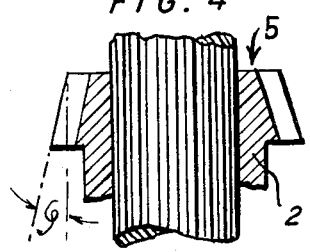
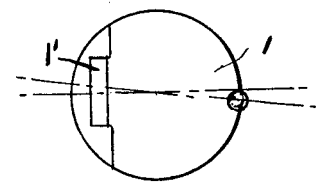
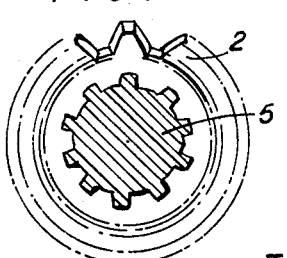
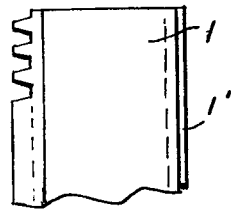
INVENTORS
MASUMI EDA
TOSHIO OTAKI
BY
James M. Drysdale
ATTORNEY

United States Patent Office 3,136,173
Patented June 9, 1964

3,136,173
DRIVING MECHANISM OF THE CUTTER
SPINDLE IN GEAR SHAPER
Masumi Eda, 3 7-chome, Denyenchofu, Ota-ku, and
Toshio Otaki, 272 2-chome, Shin machi, Setagaya-ku,
both of Tokyo, Japan
Filed Aug. 15, 1961, Ser. No. 131,648
2 Claims. (Cl. 74—422)

Heretofore to drive the cutter spindle of the gear shaper along its axial direction, the rocking motion of the segment toothed wheel was transmitted to the worm formed on the exterior of the cutter spindle, or the motion was transmitted through the usual gearing such as a pinion and a rack, the latter formed on the sleeve fitted around the spindle.

However, since the cutter spindle not only repeats constantly a complex motion composed of rotation and reciprocation, but is subjected to cutting resistance accompanied with shocks, the surfaces of the teeth transmitting motion wear considerably, thus increasing their backlash, so that the precision of the teeth cut in the work piece was seriously injured.

The object of our invention is to eliminate such priorly unavoidable increase of backlash, with extremely simple structure and without changing or renewing the toothed wheel or rack; consequently obtaining a mechanism which ensures a high degree of cutting.

The gist of this present invention is the use of a taper toothed gear wheel, which is fixed slidably above the spline shaft, in the transmission system carrying motion to the cutter spindle from the rocking shaft, or through the rocking shaft from the reciprocating member; so that its fixed position can be adjusted in the direction of the axis of the shaft, and a rack to gear connection is provided on the sleeve fitted around the cutter spindle.

The cutter spindle is positioned crosswise at right angles to the spline shaft, and positioned so as to be in an inclined state at the same angle as the angle of inclination of the tapered tooth to the axes of the wheel. Thus by applying the characteristic of the taper toothed wheel to the driving system of the cutter spindle, any kind of backlash which may exist can be instantly removed.

The drawing depicts the drive mechanism according to the present invention.

FIG. 1 is a plan view in horizontal cross section along the line 1—1 of FIG. 2. The lower portion of the figure is the front of the gear shaper and the upper portion of the figure containing section indicator 2—2 is the rear of the gear shaper;

FIG. 2 is a side view in vertical cross section, near the rear of the gear shaper along the line 2—2 of FIG. 1; Line H—H is a trace of a horizontal cutting plane for FIG. 1;

FIG. 3 is a side view in vertical cross section, near the front of the gear shaper along the line 3—3 of FIG. 1; Line H—H is a trace of a horizontal cutting plane for FIG. 1;

FIG. 4 is a horizontal cross section of the taper toothed wheel 2 of FIG. 1, drawn to a slightly enlarged scale; the arrow 5 indicates the line of sight for FIG. 5;

FIG. 5 is an end view of the taper toothed wheel 2 looking in a direction corresponding to that of arrow 5 of FIG. 4, and in which a tooth is enlarged to show its shape in greater detail;

FIG. 6 is a top enlarged view of the rack bar 1' which is in mesh with taper toothed wheel 2 as shown in FIGURES 1 and 3, and;

FIG. 7 is a side view of the rack bar 1 drawn to the same scale as FIG. 6.

The following is the preferred embodiment of the invention.

Shaft 1 is the driving shaft up and down as shown by the double-barbed arrows of FIGS. 2 and 3. Reciprocation is effected by conventional means such as a crank, connected to a cam disc, the latter contacting the end of the shaft. A rack 1' of plane sided teeth is formed at one side of an end of the driving shaft. The rack meshes with a taper toothed wheel 2, and the wheel is splined onto horizontal shaft 3.

The axial position of wheel 2 along spline 3, is determined by a bevel ended sleeve 5 fitted around the tubular elongations of the hub of the taper toothed gear 2. The sleeve 5 is confined between the chin of the wheel 2 and lock nuts 4 fixed to the end of the elongation. The sleeve 5 has a small end flange by which it is fixed to the machine frame F by conventional means (not shown), as bolts which pass through the flange and the adjacent frame portion. Shims S and S' are inserted on the opposite parallel sides of the flange, the former shims contacting the frame and the latter shims contacting the lock nuts 4. The structure disclosed by this paragraph is shown at the base of FIG. 1, adjacent section line 3—3.

At another part of the spline shaft 3 (that is, spaced from shaft 1 and adjacent section 2—2 of FIG. 1), a similar taper toothed wheel 6 is adjustably fitted. As seen in FIGS. 1 and 2, wheel 6 meshes with rack 7, which rack is provided at one side of sleeve 9.

Sleeve 9 is fitted concentrically around cutter spindle 8 with a clearance therebetween. Sleeve 9 is axially much shorter than cutter spindle 8, and thrust bearings are provided between the ends of 7 and adjacent bearing supports on 8. The rocking or oscillating motion of the spline shaft 3 is thus transmitted via gear 6, rack 7, sleeve 9 and thrust bearings to the cutter spindle as an oscillation without rotatively driving the spindle.

A frame F' is adjustably mounted (by means not shown) in frame F as to be movable towards and away from the axis of spline shaft 3. The frame F' horizontally positions (FIGS. 1 and 2) the sleeve 9 by means of a row of steel balls 10 placed between opposed vertical grooves in the sleeve and in the frame. The balls prevent rotation of sleeve 9 while at the same time they exert (via rack 7 and gear 6) a downward force (FIG. 1) on sleeve 11.

The sleeve 11 is fitted around the tubular elongation of the hub of taper wheel 6. The sleeve is confined between the chin of the wheel 6 and lock nuts 12 fixed to the end of the elongation. The sleeve 11 has a small end flange by which it is fired to the adjacent portion of the machine frame F by conventional means (not shown). Shims S and S' are inserted on the opposite parallel sides of the flange, the former shims contacting the frame, and the latter shims contacting the lock nuts 12. The structure of this paragraph and of the immediately prior 3 paragraphs are shown at the top of FIG. 1 adjacent section line 2—2.

In the operation of the described mechanism, the up and down motion of the driving shaft 1 is at first transmitted by the taper tooth wheel 2 at the right to the spline shaft 3 to rock the same, and then that rocking motion is transmitted by taper tooth wheel 2 to the rack of sleeve 9 at the left, then through the inverse up and down motion of the sleeve, to the final vertical reciprocation of the cutter spindle 8. However, since the cutter spindle 8 is loosely supported rotatably in the sleeve 9, the spindle is free to receive further rotation or arcuate movement, irrespective of the presence or absence of the up and down motions contributed to it by the transmission system here described.

An important feature of the present invention lies in the application, in a gear shaper, of taper toothed wheels meshing with separate racks, the wheels being mounted on a common spline and adjustably mounted on a common spline and adjustably mounted in their common axial direction, thus, by adjustment, to take up play or backlash between the wheels and the racks.

The taper toothed wheels 2 and 6 are generated (that is originally made from blanks by a cutter on a cutter spindle) by feeding the cutter along a line having a certain instantaneous small angle from the axis of the toothed wheel. The complete taper tooth gear may be considered as being made of a plurality of elemental wheels of minute thickness, each slightly displaced with respect to its adjacent element, and the magnitude of each displacement being directly proportional to the radius of the elemental wheel. Now if the average angle of inclination of the line of cutter feed be (as dimensioned in FIG. 4 of the drawings), then for proper meshing, the pitch plane of the rack must correspond to one side of this angle in FIG. 4. This requires that a line through the axis of the driving shaft 1 bearing rack 1' (at the bottom portion of FIG. 1) must be in advance of or below the perpendicular line 3—3 where the line cuts across the rack. This is shown in the base of FIG. 1 and also in FIG. 6 wherein the small angle between the lines passing through the axis of the shaft 1 is the aforementioned angle 6 of FIG. 4.

In the above disclosed gear layout, if backlash has been produced as by wearing etc., it can be removed at once by simply changing the adjustable shims S and S', and displacing the sleeve 5 (or 11) to a new longitudinal (up and down in FIG. 1) position.

FIG. 3 shows a single row of steel balls arranged partly in opposed grooves provided in shaft 1 and the adjacent casing. These balls prevent the rotation of power input shaft 1.

Considering the foregoing description of my invention, it is obvious that the driving mechanism for the cutter spindle in a gear shaper is particularly well adapted for practical use, by reason of the convenience and ease with which it can be assembled and kept in adjustment.

It is also obvious that my invention is susceptible of some change and modification without departing from the principles and spirit thereof, and for this reason I do not wish to be understood as limiting myself to the precisely disclosed arrangement and formation of the several parts herein minutely shown. The broad phases of carrying out the invention therefore are not limited except as hereinafter claimed.

I claim:

1. A driving mechanism in a gear shaper; a vertical axis reciprocating drive shaft fixed against rotation, and having a rack along one side; a horizontal axis spline adjacent the drive shaft fixed against axial motion but permitted to rotate; a first taper tooth gear wheel mounted to mesh with the rack and to drive an end of the spline, said wheel being adjustable in the direction of the axis of the spline; a second similar taper tooth gear wheel similarly adjustably mounted on the spline at a spaced distance from the first wheel; a vertical hollow driven shaft fixed against rotation and having a second rack along one side, the second rack meshing with the second taper tooth gear; a vertical cutter spindle carried with clearance through the hollow driven shaft so as to be capable of independent rotation or rocking; and axial thrust bearings between the driven shaft and cutter spindle compelling unitary vertical motion.

2. In a drive system for the cutter spindle of a gear shaper; a frame with front and rear portions; a vertically reciprocated drive shaft mounted in the front portion of the frame; a vertical groove in the frame facing radially inward and an opposing similar groove on the diameter of the drive shaft and facing radially outward, a row of steel balls confined between the grooves to thus provide free vertical motion of the drive shaft and prevent rotary motion of the same; a gear rack at one side of the top of the drive shaft, the pitch plane of the rack being vertical and sleeved in plan by a small angle away from a perpendicular to the said diameter and towards the front of the shaper; a pair of spaced round openings in the frame centered on a horizontal axis, one of the openings being adjacent the top of the drive shaft and located in the front portion of the frame in open communication therewith; a pair of cylindrical sleeves each with a bevel at one end and an outwardly directed flange at the other end, securely fixed to the adjacent frame at the flange and each sleeve passing into one of the openings; a pair of taper toothed wheels, each wheel having a hub with a tubular elongation rotatably mounted within a sleeve, the larger diameter portion of the wheels being closer to the front of the shaper, and the taper being of such small angle that a portion of one ray or line element of the pitch cone of the wheels is within the pitch plane of an adjacent rack, the axial length of each tubular elongation of the taper toothed wheels being such that it contacts the bevels of the sleeves and extends beyond the flanges, lock nut means on the latter extensions to thus hold the wheels in fixed axial positions with respect to the frame and any meshing rack means, shim means on each side of each flange to adjustably and axially position each bevel gear with respect to planes which are perpendicular to its axis, and thus capable by adjustment to take up any play between the bevel gear and any meshing rack means; a spline shaft longitudinally fixed to the frame and making sliding contact with the interior of the hub of each taper tooth wheels, to thus accurately transmit the vertical reciprocation of the drive shaft which results in an angular locking of the front taper wheel to the rear taper wheel; a hollow vertical axis sleeve with a second rack thereon supported in the rear portion of the frame in a left to right plan relationship as compared to the vertical drive shaft, the second rack of the latter sleeve meshing at one extermity of a diameter plane with the taper tooth wheel driven by the rear portion of the spline shaft, and at the other extremity of the same diameter guided by a row of steel balls partly in the sleeve and partly in a radially adjustable part of the rear portion of the frame to thus provide free vertical motion of the latter sleeve and prevent rotary motion of the same; a vertical axis cutter spindle mounted near its bore within a cylindrical ball bearing so as to be free to rotate or oscillate or vertically reciprocate with respect to the frame, the adjacent higher part of the cutter spindle passing with a clearance through the hollow sleeve; axial-thrust bearing means between each end of the hollow sleeve and the adjacent portions of the cutter spindle, to compel identical vertical movements of the hollow sleeve and cutter spindle; the rocking motion of the rear taper wheel being transferred to the second rack to thus give reverse vertical reciprocations as compared to the vertical reciprocations of the drive shaft; the hollow sleeve and the cutter spindle performing in-phase output vertical reciprocations with fidelity as compared to the input motions of the drive shaft; and the inaccuracy between input and output motions being kept at a minimum by minimizing backlash in the gearing by adjusting the axial positions of the taper toothed wheels, and the tightness of the adjustable part of the rear portion of the frame with respect to the adjacent row of steel balls.

References Cited in the file of this patent

UNITED STATES PATENTS

| | | |
|---|---|---|
| 2,075,783 | Roberts | Mar. 30, 1937 |
| 2,384,809 | Bullard et al. | Sept. 18, 1945 |
| 2,841,025 | Chayko | July 1, 1958 |
| 2,958,263 | Paklowski | Nov. 1, 1960 |
| 2,996,929 | Lazarowics | Aug. 22, 1961 |